(12) United States Patent  
Xu et al.

(10) Patent No.: US 12,115,515 B2
(45) Date of Patent: Oct. 15, 2024

(54) STARCH-BASED ADSORBENT WITH NANOPORES AND PREPARATION METHOD THEREOF

(71) Applicant: ZHEJIANG UNIVERSITY, Hangzhou (CN)

(72) Inventors: Enbo Xu, Hangzhou (CN); Donghong Liu, Hangzhou (CN); Jianwei Zhou, Hangzhou (CN); Huan Cheng, Hangzhou (CN); Tian Ding, Hangzhou (CN); Xingqian Ye, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 744 days.

(21) Appl. No.: 17/427,922

(22) PCT Filed: Oct. 22, 2019

(86) PCT No.: PCT/CN2019/112506
§ 371 (c)(1),
(2) Date: Aug. 3, 2021

(87) PCT Pub. No.: WO2021/077290
PCT Pub. Date: Apr. 29, 2021

(65) Prior Publication Data
US 2022/0118421 A1 Apr. 21, 2022

(51) Int. Cl.
*B01J 20/24* (2006.01)
*B01J 20/06* (2006.01)
*B01J 20/28* (2006.01)
*B01J 20/30* (2006.01)
*C02F 1/28* (2023.01)
*C02F 101/30* (2006.01)

(52) U.S. Cl.
CPC .............. *B01J 20/24* (2013.01); *B01J 20/06* (2013.01); *B01J 20/2808* (2013.01); *B01J 20/3085* (2013.01); *B01J 2220/46* (2013.01); *C02F 1/286* (2013.01); *C02F 2101/308* (2013.01)

(58) Field of Classification Search
CPC ... B01J 20/02; B01J 20/06; B01J 20/24; B01J 20/28009; B01J 20/28078; B01J 20/2808; B01J 20/30; B01J 20/3007; B01J 20/3085; B01J 20/3212; B01J 20/3236; B01J 2220/46; C02F 1/286; C02F 2101/308
See application file for complete search history.

(56) References Cited

FOREIGN PATENT DOCUMENTS

| CN | 105642244 | * | 6/2016 | ............. B01J 20/24 |
| WO | WO-9939806 A1 | * | 8/1999 | ............. B01D 37/02 |
| WO | WO-2010019077 A1 | * | 2/2010 | ............. B01J 20/10 |

* cited by examiner

*Primary Examiner* — Brian A McCaig

(57) ABSTRACT

A preparation method for a nanopore starch-based adsorbent. The method mainly comprises: constructing a large number of lamellar crystals on surfaces of starch granules, and inducing the formation of a nano-scale pore channel structure by means of the lamellar crystals. A large number of control tests have proved that the flaky crystals have direct influence on the formation of the nano-scale pore channel structure. The construction of a pore channel structure in a starch matrix material greatly increases the specific surface area, and improves the adsorption properties. In addition, the method is beneficial to the introduction of functional particles (magnetic particles), and avoids the problem of pore channel blockage due to first forming pores and then introducing functional particles.

9 Claims, 5 Drawing Sheets

STARCH-BASED ADSORBENT WITH NANOPORES AND PREPARATION METHOD THEREOF

FIELD

The present disclosure discloses a starch-based adsorbent with nanopores and a preparation method of the starch-based adsorbent with nanopores, in particular to a preparation method of the starch-based magnetic material with nanopores by iron mineralization on the surfaces of the starch in cooperation with magnetization by extruding and embedding $Fe^0$.

BACKGROUND

Environmental pollution is becoming more and more serious. Water pollution resulted from, for example, wastewater discharging from food processing and chemical dye, has been threatening the safety of ecological environment and human production activities. Porous material, a kind of functional material synthesized or modified from organic and inorganic raw materials, has strong adsorption performance and can purify polluted waters because of its special and huge specific surface area and pore space.

At present, the preparation and large-scale application of porous materials are facing many challenges:

First, the traditional adsorbent is easy to shed particles in the process of water purification, causing a secondary pollution. New materials, such as graphene/graphene oxide, metal-organic frameworks (MOFs), carbon nanotubes/nanoparticles, inorganic silicon/zeolite/sepiolite, have strong adsorption capacity, but they are all non-biodegradable and expensive to prepare. Meanwhile, the particles shed into the water from the above new materials are nanoscale pollutants, and the secondary pollution caused by the particles is difficult to estimate.

Secondly, the separation of porous adsorbent is difficult and inefficient. It is difficult to effectively separate the porous materials which are enriched with pollutants after purifying water. Researchers often prepare magnetic porous materials, which can purify water and be magnetically separated, by magnetizing porous materials, that is, loading magnetic particles or magnetic fluids in the existing material matrix. However, it is difficult to control the magnet loading when magnetizing porous materials: the physical binding rate between the magnetic particles and the material matrix is low, resulting in a low magnet loading rate and a low saturation magnetization value; the magnetic fluid is easy to block the pore space of the material matrix, resulting in an invalid adsorption of pore space.

Starch is widely available, green, safe, biodegradable, and has good processability, which can be used as a potential raw material for functional adsorbents. However, the adsorption capacities of natural starch and its derivatives are poor (about 3 mg MB/g starch, wherein MB represents methylene blue). Even though porous structures can be obtained by modifying the starch by a biological enzyme method, a physical method, or a combined method of the two, the pore sizes of the porous structures are large, and the adsorption capacities of the porous structures are still not high (<10 mg MB/g starch). The performance of the resulted material by modifying starch through a chemical method is relatively good, but the large amount of chemical reagents introduced is not conducive to environmental protection, and the ratio of the weight of the starch to the weight of the resulted material is often less than 50% (i.e. the starch content is less than 50%, and the adsorption capacity of the resulted material is actually improved by increasing the content of other reagents). In addition, the pores of the traditional porous starch are large (1 μm to 2 μm) and go through the starch, which are almost occupied by magnetic materials after magnetization, causing a loss of the original pore space.

SUMMARY

One object of the present disclosure is to provide a preparation method of a porous starch-based adsorbent. Compared with traditional porous starch, the starch-based adsorbent prepared by this method has nanopores, extremely high specific surface area, and stronger adsorption performance.

Another object of the present disclosure is to provide a preparation method of a porous starch-based adsorbent. Compared with the traditional chemically synthesized adsorbent, the starch-based adsorbent prepared by this method has better degradability and biosafety.

Any of the above methods at least includes inducing a surface mineralization, and further inducing the formation of nanopores on the mineralized surfaces.

Any of the above methods may further include: introducing functional metal particles during the enzymatic screw extrusion process to provide the adsorbent with magnetism or additional adsorption. The porous starch-based adsorbent can provide a good loading environment for the functional metal particles and ensure the functional stability of the functional metal particles.

The present disclosure discloses a preparation method of a starch-based adsorbent with nanopores, which mainly includes forming a large number of flake-like crystals on surfaces of starch particles, and inducing formations of nanopores by the flake-like crystals. The present disclosure proves through a large number of comparative experiments that the flake-like crystals have a direct influence on the formation of nanopores.

Specifically, the method at least includes:
(1) adding zero-valent metal particles I into a starch aqueous suspension subjected to a hydroxyl ionization treatment to induce a surface mineralization of the starch, thereby forming flake-like mineralized crystals on surfaces of the starch particles; and
(2) mixing the mineralized starch with an amylase preparation, and then forming the starch-based adsorbent with nanopores by an enzymatic screw extrusion.

The hydroxyl ionization treatment in this field means that the hydroxyls of the starch lose $H^+$, and the oxygen atoms of the hydroxyls of the starch are combined with metal ions. Specifically, the present disclosure adopts the following means:

mixing divalent or higher-valent metal salt with the starch in a water bath having a pH value of 5 to 9 and a temperature of 10° C. to 50° C. for 30 min to 360 min, and then sieving and cleaning to obtain a modified starch with oxygen atoms of hydroxyls thereof combined with metal ions, wherein the divalent or higher-valent metal salt is one or more selected from the group consisting of magnesium, calcium, strontium, barium, titanium, zirconium, chromium, molybdenum, manganese, cobalt, nickel, copper, zinc and aluminum;

Cations of divalent or higher-valent metal salt can enter or be enriched on the surface of starch particles in an aqueous suspension to replace the hydrogen atoms of the hydroxyls of the starch to form new bonds, which, on one hand, strengthens the structure of the starch and promotes the selective degradation of the starch by amylase during extrusion, on the other hand, facilitates the attraction of the surfaces of the starch to the metal ions in the process of mineralizing the starch to form the mineralized crystals.

The surface mineralization in this field refers to the process of converting organic compounds on the surfaces into inorganic compounds. The hydroxyl ionization treatment on the surface is a process of activating the surface. Specifically, on the basis of the hydroxyl ionization treatment, the present disclosure performs mineralization by the following means:

mixing the starch with ionized hydroxyls with the zero-valent metal particles I, wherein the zero-valent metal particles I lose electrons and become metal ions, and the metal ions compound with the ionized hydroxyls of the starch in situ to induce the surface mineralization of the starch.

During the extrusion process in step 2, functional zero-valent metal particles II (e.g., zero-valent iron particles Fe0 Ps) are further added, and the mass ratio of the starch to the zero-valent metal particles II ranges from 100:2 to 100:50. The zero-valent metal particles I and the zero-valent metal particles II may be the same metal particle or different metal particles. The zero-valent metal particles I are configured to induce the surface mineralization of the starch, and the zero-valent metal particles II are configured to provide the adsorbent with more functionalities. In certain preferred embodiments, the zero-valent metal particles I and the zero-valent metal particles II are both zero-valent iron particles Fe0 Ps.

In some embodiments, the adsorbent can be prepared by the following steps:
- (A1) ionizing hydroxyls of the starch: mixing divalent or higher-valent metal salt with the starch in a water bath having a pH value of 5 to 9 and a temperature of 10° C. to 50° C. for 30 min to 360 min, wherein the mass ratio of the divalent or higher-valent metal salt to the starch ranges from 0.05 g/g-to 0.6 g/g, and the concentration of the starch ranges from 50 g/L to 200 g/L, and sieving and cleaning to obtain a modified starch with oxygen atoms of hydroxyls thereof combined with metal ions;
- (A2) mineralizing the modified starch: placing the modified starch with ionized hydroxyls in step (A1) into an aqueous suspension with a temperature of 20° C. to 45° C., adding zero-valent iron particles $Fe^0$ Ps, and stirring and mixing for 5 min to 15 min until the color of the modified starch turns yellow brown;
- (A3) sucking out the remaining $Fe^0$ Ps by a magnet, and sieving and drying at a low temperature of 30° C. to 45° C.; and
- (A4) forming the starch with nanopores by an enzymatic extrusion: adding the amylase preparation into the dried product in step (A3) for pre-conditioning and obtaining a mixture, and feeding the mixture into a cavity of an extruding machine for reaction, and discharging to obtain the starch-based magnetic adsorbent with nanopores.

In some preferred embodiments, a magnetic adsorbent having dual adsorption function of porous structure and iron can be prepared by the following steps:
- (B1) ionizing hydroxyls of the starch: mixing divalent or higher-valent metal salt with the starch in a water bath having a pH value of 5 to 9 and a temperature of 10° C. to 50° C. for 30 min to 360 min, wherein the mass ratio of the divalent or higher-valent metal salt to the starch ranges from 0.05 g/g to 0.6 g/g, and the concentration of the starch ranges from 50 g/L to 200 g/L, and sieving and cleaning to obtain a modified starch with oxygen atoms of hydroxyls thereof combined with metal ions;
- (B2) mineralizing the modified starch: placing the modified starch with ionized hydroxyls in step (B1) into an aqueous suspension with a temperature of 20° C. to 45° C., adding zero-valent iron particles $Fe^0$ Ps, and stirring and mixing for 5 min to 15 min until the color of the modified starch turns yellow brown, wherein the volume fraction of the starch in the aqueous suspension ranges from 100 g/L to 800 g/L;
- (B3) sieving and drying at a low temperature of 30° C. to 45° C.; and
- (B4) forming the starch with nanopores by an enzymatic extrusion: adding the amylase preparation into the dried product in step (B3) for pre-conditioning and obtaining a mixture, and feeding the mixture into a cavity of an extruding machine for reaction, and discharging to obtain the starch-based magnetic adsorbent with nanopores.

In some preferred embodiments, a magnetic adsorbent having dual adsorption function of porous structure and iron can be prepared by the following steps:
- (C1) ionizing hydroxyls of the starch: mixing divalent or higher-valent metal salt with the starch in a water bath having a pH value of 5 to 9 and a temperature of 10° C. to 50° C. for 30 min to 360 min, wherein the mass ratio of the divalent or higher-valent metal salt to the starch ranges from 0.05 g/g to 0.6 g/g, and the concentration of the starch ranges from 50 g/L to 200 g/L, and sieving and cleaning to obtain a modified starch with oxygen atoms of hydroxyls thereof combined with metal ions;
- (C2) mineralizing the modified starch: placing the modified starch with ionized hydroxyls in step (C1) into an aqueous suspension with a temperature of 20° C. to 45° C., adding zero-valent iron particles $Fe^0$ Ps, and stirring and mixing for 5 min to 15 min until the color of the modified starch turns yellow brown;
- (C3) sucking out the remaining $Fe^0$ Ps by a magnet, and sieving and drying at a low temperature of 30° C. to 45° C.; and
- (C4) forming the starch with nanopores by an enzymatic extrusion: adding the amylase preparation into the dried product in step (C3) for pre-conditioning and acquiring a mixture, feeding the mixture into a cavity of an extruding machine for a pre-extrusion reaction, adding $Fe^0$ Ps for a continuous extrusion reaction after the pre-extrusion reaction, and discharging after the continuous extrusion reaction to obtain the starch-based magnetic adsorbent with nanopores.

In certain preferred embodiments, the average particle size of the zero-valent iron particles $Fe^0$ Ps ranges from 50 nm to 100 μm.

The amylase preparation is one or more selected from the group consisting of thermostable α-amylase, mesophilic α-amylase, β-amylase, pullulanase and isoamylase, which are all commercially available.

The method of the enzymatic screw extrusion is common, and the mixture preconditioned by the amylase preparation has a humidity ranging from 26 wt % to 52 wt %, an enzyme content ranging from 0.01% to 1.5%, and a pH value ranging from 4.5 to 9.5. The operating parameters of the enzymatic extrusion include an extrusion temperature ranging from 50° C. to 120° C., a screw speed ranging from 30 rpm to 400 rpm, and an extrusion treatment time ranging from 2 min to 15 min. In the case of two stages of extrusion, which are carried one after the other, an extrusion treatment time of materials in the pre-extrusion stage which is controlled within 1 min to 6 min, and another extrusion treatment time of materials in the continuous extrusion stage which is controlled within 1 min to 9 min.

The present disclosure has the following beneficial effects:

Compared with the prior art, the starch-based magnetic adsorbent with nanopores provided by the present disclosure has the advantages that: 1. the adsorption and removal effect on a target object is very high through the physical adsorption of nanopores, and the starch-based adsorbent is firm in structure and degradable, and is not easy to cause secondary pollution: 2. the suspension can be reused and a continuous extrusion is adopted, so that and the preparation steps are relatively simple, green and safe, the yield is high (nearly 100%), and the raw materials are fully utilized; 3. The magnetism of the adsorbent can be controlled according to the amount of $Fe^0$ introduced, and the magnet does not affect the pore space and internal surface areas of the material; 4. the raw material of starch is cheap and easily available, and in the case where the raw material of starch accounts for 70% to 95%, the adsorbent can still provide good adsorption and magnetic properties.

BRIEF DESCRIPTION OF THE DRAWINGS

FIGS. 2(d-e) are SEM images of mineralized modified starch before the enzymatic reactive extrusion (eREX) process at different magnifications;

FIG. 6(a) is an SEM image of Zn-ST@$Fe^0$ Ps; FIG. 6(b) shows an EDS result of Zn-ST@$Fe^0$ Ps.

DETAILED DESCRIPTION OF THE EMBODIMENTS

Figure 1:
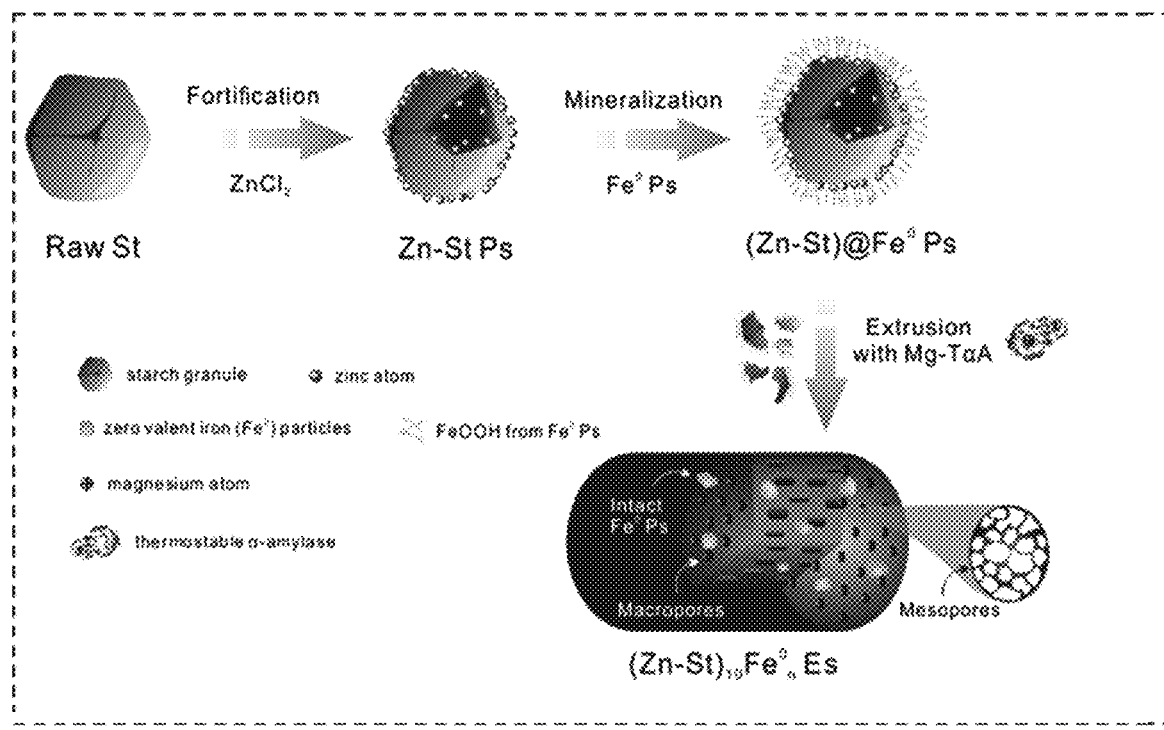
FIG. 1 is a schematic diagram of the formation of modified (zincified) starch-iron particle extrudates, i.e., extruded mineralized starch biomaterial (($Zn$-$St$)$_{10}$$Fe^0$n Es)

As shown in FIG. 1, in the modified starch with ionized hydroxyl of the present disclosure, oxygen atoms of hydroxyls are combined with positive metal ions $M^{n+}$, which causes unsaturated metal ions in aqueous suspension to repel $H^+$ and attract $OH^-$ through an electrostatic interaction, thereby modifying physical and chemical properties and electrical properties of the starch. After adding zero-valent metal particles, for example, zero-valent iron $Fe^0$ particles, $Fe^0$ particles and the modified starch particles contact with each other to form multiple groups of "micro-primary cells". Iron as a negative electrode loses electrons and becomes $Fe^{2+}$, and the modified starch as a positive electrode makes $H^+$ get electrons e to release $H_2$, resulting in enrichment of $OH^-$ around $O$-$M^{n+}$ on the surfaces of the modified starch, which, based on ionic electrification, attracts $Fe^{2+}$ to move and deposit on the surfaces of starch to form crossed flake-like iron oxide compounds or prismatic iron oxide compounds, thereby mineralizing the surfaces of starch. Then, in the micro-mixing reaction process of enzymatic extrusion, the starch matrix is sheared, dispersed, mixed, and reorganized, and nanopores are formed based on the mineralization effect and locally selective starch enzymolysis. Some of the intact $Fe^0$ particles presenting in the extrusion process are embedded in the frameworks of the porous starch-based material and function as magnets, and the other which are exposed outside can provide chemical adsorption for pollutant removal.

The following describes the present disclosure in detail with reference to examples.

Example 1

Figure 2:
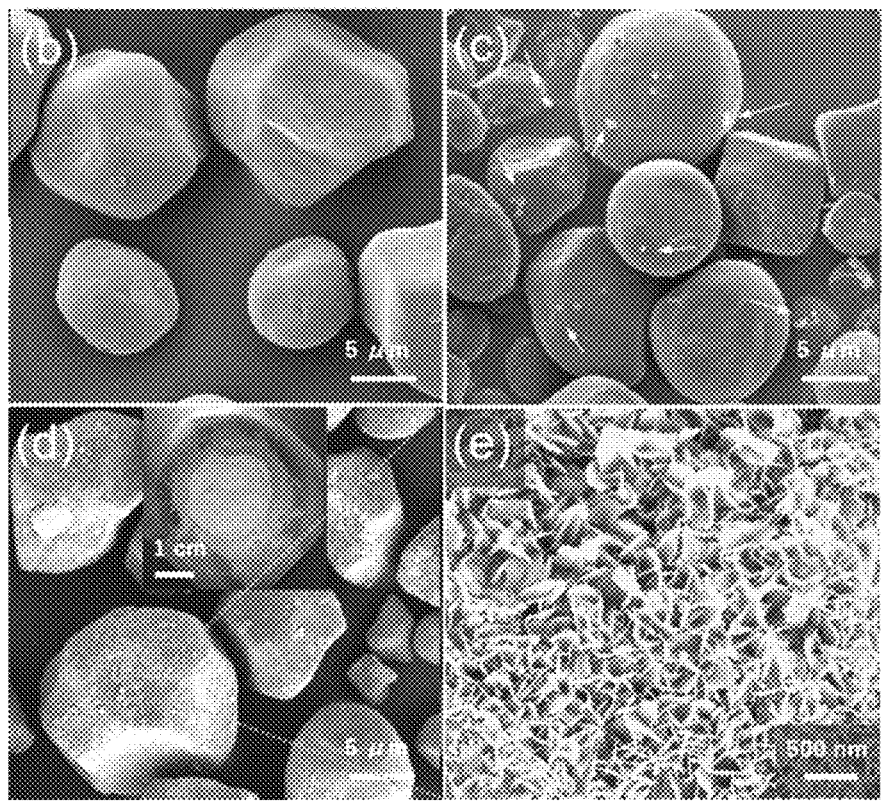
FIGS. 2(b~c) are SEM images of raw starch (St) and zinced starch (Zn-St Ps)

The present disclosure provides a starch-based adsorbent with nanopores, and the preparation method of the starch-based adsorbent with nanopores includes the following steps:

(1) mixing zinc metal salt and corn starch (as shown in FIG. 2b which is obtained by scanning electron microscope (SEM)) in a water bath (the volume fraction of the starch is 250 g/L) with a pH value of 6.5 at 35° C. for 360 min, wherein the mass ratio of the zinc metal salt to the corn starch is 0.2 g/g; and then sieving and cleaning to obtain the modified starch with oxygen atoms of hydroxyls thereof combined with zinc ions (as shown in FIG. 2c which is obtained by SEM).

The aqueous suspension which is enriched with aluminium metal salt can be retained and be recycled to prepare the modified starch by adding corn starch until the mass ratio of the zinc metal salt to the corn starch is 0.2 g/g.

Figure 6:
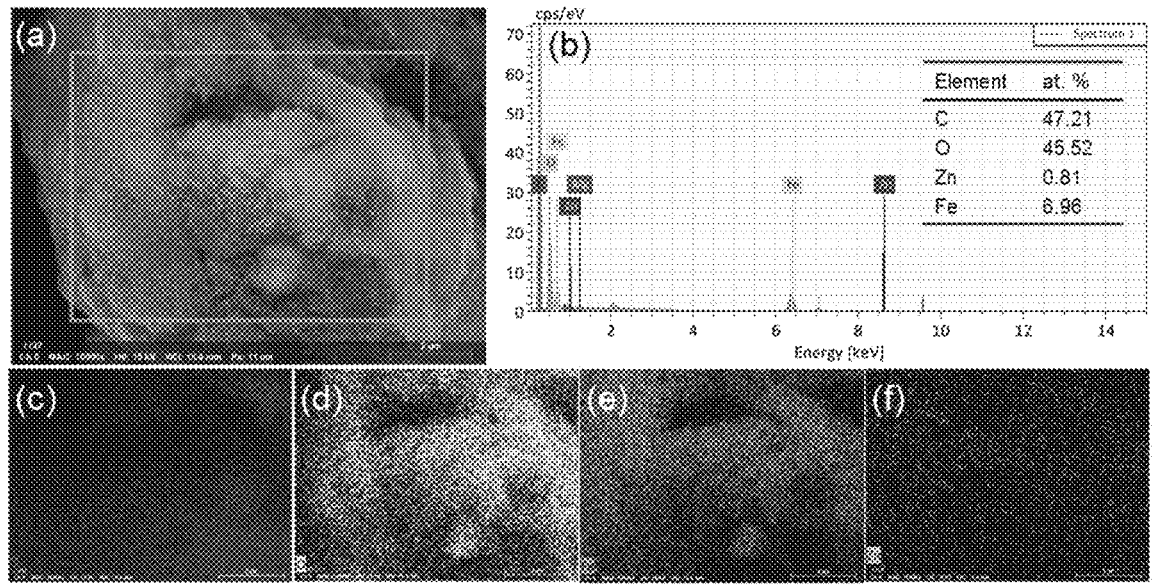
FIGS. 6(c-f) are element mappings of C, O, Fe and Zn of Zn-St@$Fe^0$ Ps.

(2) placing the modified starch with ionized hydroxyl by zinc obtained in step (1) into an aqueous suspension with a room temperature of 25° C. (the volume fraction of the starch is 600 g/L); adding zero-valent iron particles $Fe^0$ Ps with an average particle size of 26 μm (the mass ratio of $Fe^0$ to the modified starch is 0.2 g/g) and stirring and mixing for 10 min; after the color of the modified starch turns yellow-brown, sucking out the remaining $Fe^0$ Ps by a magnet; and sieving and drying at a low temperature of 40° C. to obtain the mineralized modified starch with Fe ions on the surfaces thereof (as shown in FIGS. 2b to 2e which are obtained by SEM). FIG. 6 shows an EDS spectrum of the mineralized modified starch, wherein the content of the iron element on the surfaces of the mineralized modified starch is up to about 7%, which indicates that there are iron mineralized crystals on the surfaces.

Figure 3:
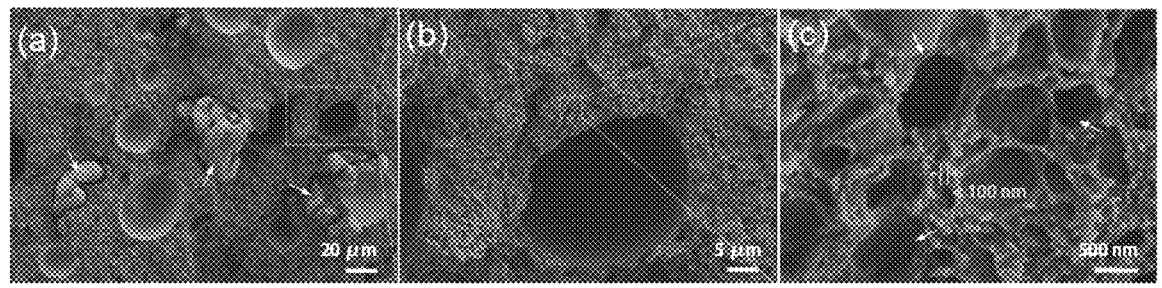
FIGS. 3(a~c) are SEM images of zinced starch-iron particle extrudates (($Zn$-$St$)$_{10}$$Fe^0_2$ Es) with 20% iron (Zn-St, db) at different magnifications.
Figure 7:
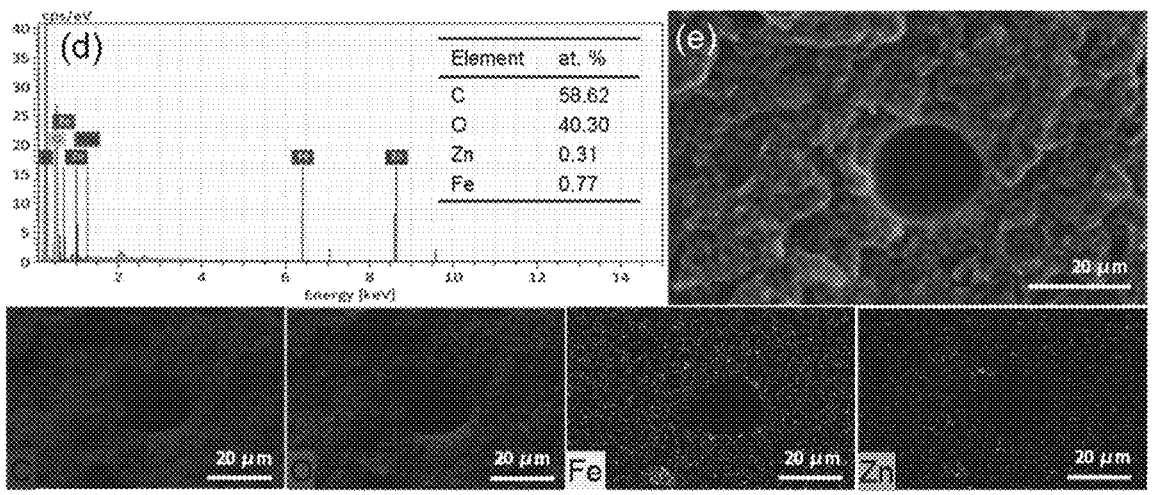
FIG. 7(d) shows an EDS result of ($Zn$-$St$)$_{10}$$Fe^0_2$ Es.
FIG. 7(e) is an element mapping of C, O, Fe and Zn of ($Zn$-$St$)$_{10}$$Fe^0_2$ Es.

(3) pre-conditioning the mixture of the mineralized modified starch obtained in step (2) and thermostable α-amylase (0.1%) (the humidity of the mixture is pre-conditioned to be 36 wt %); placing the mixture into a cavity of an extruding machine for reaction (the extrusion temperature is 90° C., the screw speed is 150 rpm, and the extrusion time is 15 min, which is calculated in the case where a certain material is continuously fed), and then discharging the material so as to obtain the starch-based adsorbent with nanopores, as shown in FIG. 3. FIG. 7 shows an EDS spectrum of the extruded mineralized starch material, wherein the content of the iron element in the resulted nanopores is about 0.8%, which indicates that the iron mineralized crystals on the surfaces of the raw starch are sheared and mixed in the extrusion process, so that the iron mineralized crystals are uniformly dispersed in the starch matrix, thereby inducing the formation of the nanopores.

Figure 8:
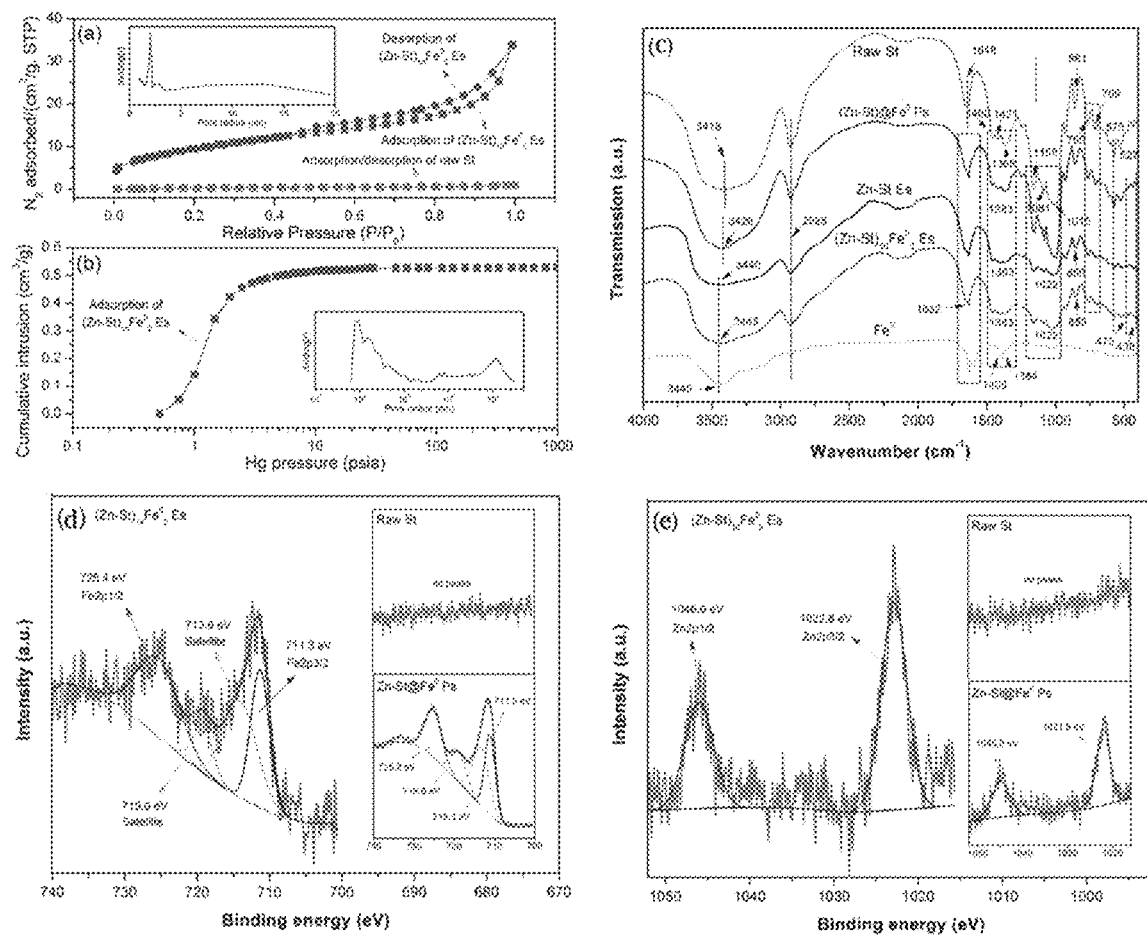
FIGS. 8(a-b), (c) and (d-e) show $N_2$ adsorption, Hg adsorption, FT-IR, XPS Fe2p and Zn2p spectra of extruded mineralized starch, respectively.

FIG. 8 shows $N_2$ adsorption, Hg adsorption, FT-KR XPS Fe2p and Zn2p spectra of the extruded mineralized starch material, from which it can be concluded that: (1) the extruded material has a porous structure, and the specific surface area and pore volume of the porous structure of the extruded material are greater than those of the raw starch, wherein the pore size generally ranges from 2 nm to 4 nm, from 50 nm to 300 nm and from 5 μm to 100 μm, and the probability of pore formation is 46.5%; (2) The resulted structure is a compound of starch chain, Fe element and Zn element.

Figure 9:
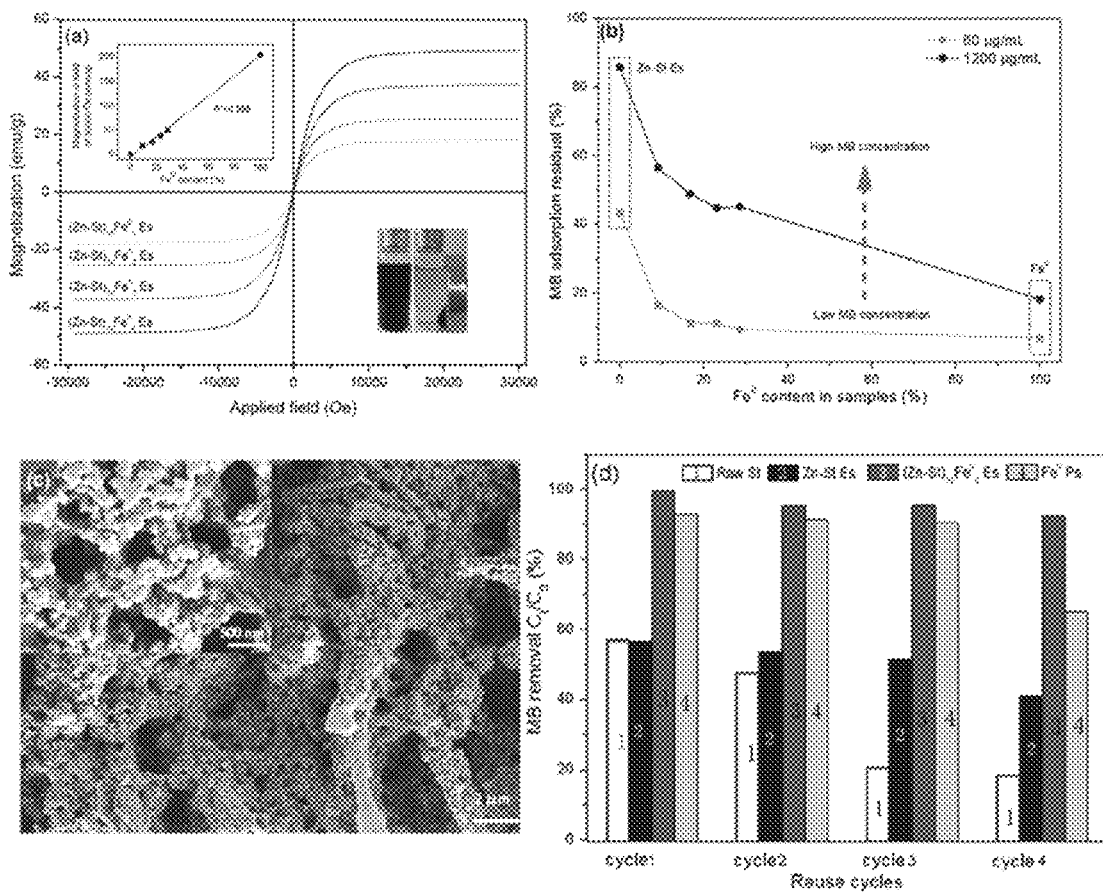
FIG. 9(a) shows a variation curve which shows the magnetization of extruded mineralized starch material as a function of the content of $Fe^0$ Ps during extrusion.
FIG. 9(b) shows variation curves which shows the adsorption capacity of ($Zn$-$St$)$_{10}$$Fe^0$n Es as a function of the content of $Fe^0$ Ps under different concentrations of methylene blue (MB)
FIG. 9(c) is an SEM image of ($Zn$-$St$)$_{10}$$Fe^0$2 Es which have adsorbed MB.
FIG. 9(d) is a comparison chart of the adsorption capacity of ($Zn$-$St$)$_{10}$$Fe^0$2 Es with St, Zn-St Es and $Fe^0$ Ps under different reuse cycles.

FIG. 9 shows the magnetization characteristics and methylene blue adsorption of the extruded mineralized starch material, indicating that the material not only has good magnetic separation ability, but also has the feasibility of cyclically adsorbing methylene blue, and the adsorption rate of methylene blue (as an example of pollutant) reaches 61.0 mg/g.

Comparative Example 1 placing starch which is not modified by ionizing hydroxyl with zinc into an aqueous suspension with a room temperature of 25° C. (the volume fraction of the starch is 600 g/L), adding zero-valent iron particles $Fe^0$ Ps with an average particle size of 26 μm (the mass ratio of $Fe^0$ to the modified starch is 0.2 g/g), and stirring and mixing for 10 min. The color of the starch does not change.

Figure 4:
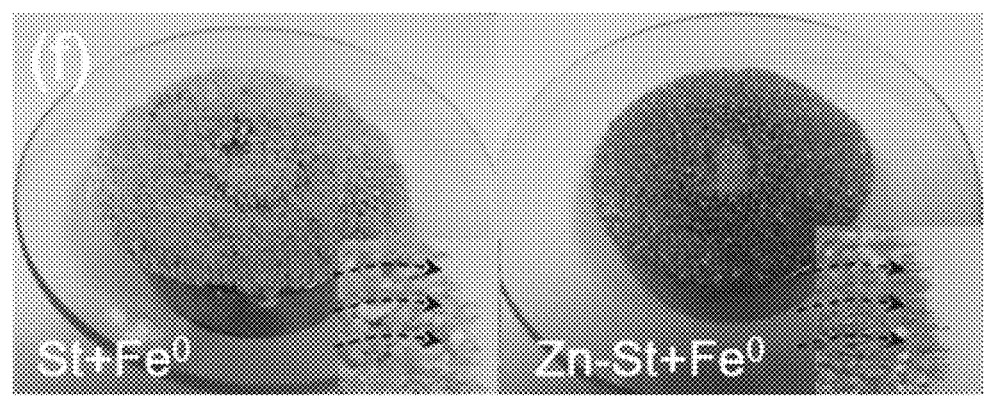
FIG. 4 is a digital image comparing non-mineralized starch (St@$Fe^0$ Ps) (left) and mineralized starch (Zn-St@$Fe^0$ Ps) (right)

As shown in FIG. 4, compared with the mineralized modified starch obtained in step 2 of Example 1, the color of the starch of Comparative example 1 is white, which is the same as that of the raw starch, indicating that the surfaces of the starch are not mineralized to generate iron mineralized crystals.

Comparative Example 2

Figure 5:
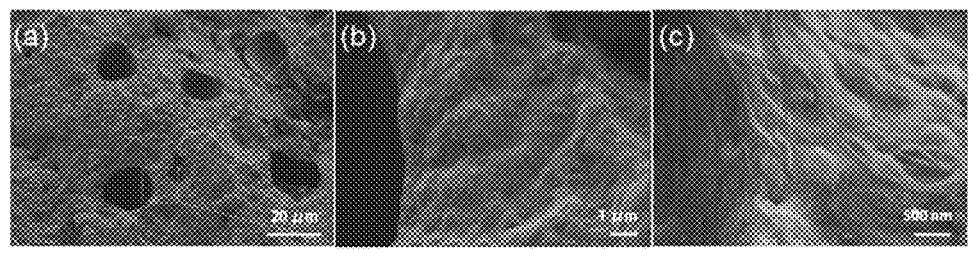
FIGS. 5(a~c) are SEM images of Zn-St Es obtained without mineralization at different magnifications.

(1) mixing zinc metal salt and corn starch in a water bath (the volume fraction of the starch is 250 g/L) with a pH value of 6.5 at 35° C./L, wherein the mass ratio of the zinc metal salt to the corn starch is 0.2 g/g for 360 min; and then sieving and cleaning to obtain the modified starch with oxygen atoms of hydroxyls thereof combined with metal zinc ions; and (2) pre-conditioning the mixture of the modified starch obtained in step (1) and thermostable α-amylase (0.1%) (the humidity of the mixture is pre-conditioned to be 36 wt %); placing the mixture into a cavity of an extruding machine for reaction (the extrusion temperature is 90° C., the screw speed is 150 rpm, and the extrusion time is 15 min which is calculated in the case where a certain material is continuously fed), and then discharging the material so as to obtain the starch-based adsorbent, as shown in FIG. 5. It shows that the starch, which is only modified by ionizing hydroxyls but not mineralized, cannot form nanopores after the enzymatic screw extrusion.

Example 2

The present disclosure provides a starch-based magnetic adsorbent with nanopores, and the preparation method of the starch-based magnetic adsorbent with nanopores includes the following steps:

(1) mixing aluminium metal salt and potato starch in a water bath (the volume fraction of the starch is 200 g/L) with a pH value of 9 at 50° C. for 30 min, wherein the mass ratio of the aluminium metal salt to the potato starch is 0.05 g/g; and then sieving and cleaning to obtain the modified starch with oxygen atoms of hydroxyls thereof combined with aluminium ions. Through SEM observation, the surfaces of the modified starch particles are the same as those of unmodified starch particles.

The aqueous suspension which is enriched with aluminium metal salt can be retained and be recycled to prepare the modified starch by adding potato starch until the mass ratio of the aluminium metal salt to the potato starch is 0.05 g/g;

(2) placing the modified starch with ionized hydroxyl by aluminium obtained in step (1) into an aqueous suspension with a temperature of 20° C. (the volume fraction of the starch is 800 g/L); adding zero-valent iron particles $Fe^0$ Ps with an average particle size of 100 μm (the mass ratio of $Fe^0$ to the modified starch is 1 g/g) and stirring and mixing for 15 min; after the color of the modified starch turns yellow-brown, sieving and drying at a low temperature of 45° C. to obtain the mineralized modified starch with Fe ions loaded on the surfaces thereof. Through SEM observation, there are a large number of flake-like crystals on the surfaces of the mineralized modified starch; EDS spectrum shows that the content of the iron element on the surfaces of the mineralized modified starch is up to about 7%, which indicates that there are iron mineralized crystals covered on the surfaces.

(3) pre-conditioning the mixture of the mineralized modified starch obtained in the step (2), mesophilic α-amylase (1.5%) and isoamylase (0.01%) (the humidity of the mixture is pre-conditioned to be 52 wt %); placing the mixture into a cavity of an extruding machine for reaction (the extrusion temperature is 50° C., the screw speed is 30 rpm, and the extrusion time is 2 min which is calculated in the case where a certain material is continuously fed), and then discharging the material so as to obtain the starch-based magnetic adsorbent with nanopores, the structure of which is similar to the structure as shown in FIG. 3.

The starch-based magnetic adsorbent with nanopores obtained in this example has nanopore sizes ranging from 20 nm to 80 nm, a probability of pore formation of 31.2%, a saturation magnetization value of 106.24 emu/g, and an adsorption rate of methylene blue (as an example of pollutant) of 28.3 mg/g.

Example 3

The present disclosure provides a starch-based magnetic adsorbent with nanopores, and the preparation method of starch-based magnetic adsorbent with nanopores includes the following steps:

(1) mixing zinc metal salt and cassava starch in a water bath (the volume fraction of the starch is 125 g/L) with a pH value of 7 at 35° C. for 180 min, wherein the mass ratio of the zinc metal salt to the cassava starch is 0.2 g/g; and then sieving and cleaning to obtain the modified starch with oxygen atoms of hydroxyls thereof combined with metal zinc ions. The surfaces of the modified starch are the same as those of unmodified starch particles under SEM observation.

(2) placing the modified starch with ionized hydroxyl by zinc obtained in step (1) into an aqueous suspension with a temperature of 30° C. (the volume fraction of the starch is 300 g/L); adding. zero-valent iron particles $Fe^0$ Ps (the mass ratio of $Fe^0$ to the modified starch is 0.3 g/g) with an average particle size of 30 μm and stirring and mixing for 8 min; after the color of the modified starch turns yellow-brown, sucking out the $Fe^0Ps$ by magnet; sieving and drying at a low temperature of 40° C. to obtain the mineralized modified starch with Fe ions loaded on the surfaces thereof. Through SEM observation, there are a large number of flake-like crystals on the surfaces of the mineralized modified starch; EDS spectrum shows that the content of the iron element on the surfaces of the mineralized modified starch is up to about 7%, which indicates that there are iron mineralized crystals on the surface.

(3) pre-conditioning the mixture of the mineralized modified starch obtained in step (2) and thermostable α-amylase (1%)(the humidity of the mixture is pre-conditioned to be 42 wt %); placing the mixture into a cavity of an extruding machine for reaction, wherein the extrusion time is 6 min which is calculated in the case where a certain material is continuously fed, and adding $Fe^0$ particles into the mixture for reaction, wherein the mass ratio of $Fe^0$ particles to the starch is 0.3 g/g, the extrusion temperature is 90° C., the screw speed is 200 rpm, and the extrusion time is 9 min which is calculated in the case where a certain material is continuously fed, and then discharging the material so as to obtain the starch-based magnetic adsorbent with nanopores.

The starch-based magnetic adsorbent with nanopores obtained in this example has nanopore sizes ranging from 50 nm to 200 nm, a probability of pore formation of 63.7%, a saturation magnetization value of 40.72 emu/g, and an adsorption rate of methylene blue (as an example of pollutant) of 76.13 mg/g.

Example 4

The present disclosure relates to a starch-based magnetic adsorbent with nanopores, and the preparation method of starch-based magnetic adsorbent with nanopores includes the following steps:

(1) mixing manganese metal salt and corn starch in a water bath (the volume fraction of the starch is 50 g/L) with a pH value of 5 at 10° C. for 360 min, wherein the mass ratio of the manganese metal salt to the corn starch is 0.6 g/g; and then sieving and cleaning to obtain the modified starch with oxygen atoms of hydroxyls thereof combined with metal manganese ions. The surfaces of the modified starch are the same as those of unmodified starch particles under SEM observation.

(2) placing the modified starch with ionized hydroxyl by manganese obtained step (1) into an aqueous suspension with a temperature of 45° C. (the volume fraction of the starch is [00 g/L); adding. zero-valent iron particles $Fe^0$ Ps with an average particle size of 50 nm (the mass ratio of $Fe^0$ to the modified starch is 0.02 g/g) and stirring and mixing for 5 minutes; after the color of the modified starch turns yellow-brown, sucking out the $Fe^0$ Ps by magnet; sieving and drying at a low temperature of 30° C. to obtain the mineralized modified starch with Fe ions loaded on the surfaces thereof. Through SEM observation, there are a large number of flake-like crystals on the surface of the mineralized modified starch; EDS spectrum shows that the content of the iron element on the surface the mineralized modified is up to about 7%, which indicates that there are iron mineralized crystals on the surface.

(3) pre-conditioning the mixture of the mineralized modified starch obtained in step (2), thermostable α-amylase (0.1%), and pullulanase (1.5%) (the humidity of the mixture is pre-conditioned to be 26 wt %); placing the mixture into a cavity of an extruding machine for reaction, wherein the extrusion time is 1 min which is calculated in the case where a certain material is continuously fed, and adding $Fe^0$ particles into the mixture for reaction, wherein the mass ratio of $Fe^0$ particles to the starch is 0.02 g/g, the extrusion temperature is 120° C., the screw speed is 30 rpm, and the extrusion time is 1 min which is calculated in the case where a certain material is continuously fed, and then discharging the material so as to obtain the starch-based magnetic adsorbent with nanopores.

The starch-based magnetic adsorbent with nanopores obtained in this example has nanopore sizes ranging from 100 nm to 500 nm, a probability of pore formation of 47.82%, a saturation magnetization value of 5.23 emu/g, and an adsorption rate of methylene blue (as an example of pollutant) of 35.73 mg/g.

What is claimed is:

1. A preparation method of a starch-based adsorbent with nanopores, at least comprising the following steps:
    (1) adding zero-valent metal particles I into a starch aqueous suspension subjected to a hydroxyl ionization treatment to induce a surface mineralization of the starch, thereby forming flake-like mineralized crystals on surfaces of the starch particles; and
    (2) mixing the mineralized starch with an amylase preparation, and then forming the starch-based adsorbent with nanopores by an enzymatic screw extrusion.

2. The method according to claim 1, wherein the surface mineralization of step (1) at least comprises the following steps:
    (1.1) carrying out the hydroxyl ionization treatment on the starch, the hydroxyl ionization treatment comprising: mixing divalent or higher-valent metal salt with the starch in a water bath having a pH value of 5 to 9 and a temperature of 10° C. to 50° C. for 30 min to 360 min, and then sieving and cleaning to obtain a modified starch with oxygen atoms of hydroxyls thereof combined with metal ions, wherein the divalent or higher-valent metal salt is one or more selected from the group consisting of magnesium, calcium, strontium, barium, titanium, zirconium, chromium, molybdenum, manganese, cobalt, nickel, copper, zinc and aluminum; and
    (1.2) mixing the starch with ionized hydroxyls with the zero-valent metal particles I, wherein the zero-valent metal particles I lose electrons and become metal ions, and the metal ions compound with the ionized hydroxyls of the starch in situ to induce the surface mineralization of the starch.

3. The method according to claim 1, further comprising adding functional zero-valent iron particles $Fe^0$ Ps during the extrusion in step (2), wherein the mass ratio of the starch to the zero-valent metal particles II ranges from 100:2 to 100:50.

4. The method according to claim 3, comprising the following steps:
    (A1) ionizing hydroxyls of the starch: mixing divalent or higher-valent metal salt with the starch in a water bath having a pH value of 5 to 9 and a temperature of 10°

C. to 50° C. for 30 min to 360 min, wherein the mass ratio of the divalent or higher-valent metal salt to the starch ranges from 0.05 g/g to 0.6 g/g, and the concentration of the starch ranges from 50 g/L to 200 g/L, and sieving and cleaning to obtain a modified starch with oxygen atoms of hydroxyls thereof combined with metal ions;

(A2) mineralizing the modified starch: placing the modified starch with ionized hydroxyls in step (A1) into an aqueous suspension with a temperature of 20° C. to 45° C., adding zero-valent iron particles $Fe^0$ Ps, and stirring and mixing for 5 min to 15 min until the color of the modified starch turns yellow brown, wherein the volume fraction of the starch in the aqueous suspension ranges from 100 g/L to 800 g/L;

(A3) sieving and drying at a low temperature of 30° C. to 45° C.; and (A4) forming the starch with nanopores by the enzymatic screw extrusion: adding the amylase preparation into the dried product in step (A3) for pre-conditioning and obtaining a mixture, and feeding the mixture into a cavity of an extruding machine for reaction, and discharging to obtain the starch-based adsorbent with nanopores.

5. The method according to claim 4, wherein the average particle size of the zero-valent iron particles $Fe^0$ Ps ranges from 50 nm to 100 μm.

6. The method according to claim 4, wherein the mixture preconditioned by the amylase preparation has a humidity ranging from 26 wt % to 52 wt %, an enzyme content ranging from 0.01% to 1.5%, and a pH value ranging from 4.5 to 9.5.

7. The method according to claim 4, wherein operating parameters of the enzymatic screw extrusion comprise an extrusion temperature ranging from 50° C. to 120° C., a screw speed ranging from 30 rpm to 400 rpm, and an extrusion treatment time ranging from 2 min to 15 min.

8. The method according to claim 3, comprising the following steps:

(B1) ionizing hydroxyls of the starch: mixing divalent or higher-valent metal salt with the starch in a water bath having a pH value of 5 to 9 and a temperature of 10° C. to 50° C. for 30 min to 360 min, wherein the mass ratio of the divalent or higher-valent metal salt to the starch ranges from 0.05 g/g to 0.6 g/g, and the concentration of the starch ranges from 50 g/L to 200 g/L, and sieving and cleaning to obtain a modified starch with oxygen atoms of hydroxyls thereof combined with metal ions;

(B2) mineralizing the modified starch: placing the modified starch with ionized hydroxyls in step (B1) into an aqueous suspension with a temperature of 20° C. to 45° C., adding zero-valent iron particles $Fe^0$ Ps, and stirring and mixing for 5 min to 15 min until the color of the modified starch turns yellow brown;

(B3) sucking out remaining $Fe^0$ Ps by a magnet, and sieving and drying at a low temperature of 30° C. to 45° C.; and (B4) forming the starch with nanopores by the enzymatic screw extrusion: adding the amylase preparation into the dried product in step (B3) for pre-conditioning and acquiring a mixture, feeding the mixture into a cavity of an extruding machine for a pre-extrusion reaction, adding $Fe^0$ Ps for a continuous extrusion reaction after the pre-extrusion reaction, and discharging after the continuous extrusion reaction to obtain the starch-based adsorbent with nanopores.

9. The method according to claim 8, wherein operating parameters of the enzymatic screw extrusion comprise an extrusion temperature ranging from 50° C. to 120° C., a screw speed of 30 rpm to 400 rpm, an extrusion treatment time of materials in a pre-extrusion stage which is controlled within 1 min to 6 min, and another extrusion treatment time of materials in a continuous extrusion stage which is controlled within 1 min to 9 min.

* * * * *